(12) United States Patent
Lambert et al.

(10) Patent No.: US 10,061,128 B2
(45) Date of Patent: Aug. 28, 2018

(54) DISPLAY DEVICE FOR A MOTOR VEHICLE

(71) Applicant: Johnson Controls Automotive Electronics SAS, Cergy Pontoise (FR)

(72) Inventors: Yves Lambert, Osny (FR); Giany Pitte, Osny (FR); Jean-Francois Buchard, Nanterre (FR); Thierry Acas, Fresne Leguillon (FR)

(73) Assignee: JOHNSON CONTROLS AUTOMOTIVE ELECTRONICS SAS, Cergy Pontoise (FR)

( * ) Notice: Subject to any disclaimer, the term of this patent is extended or adjusted under 35 U.S.C. 154(b) by 0 days.

(21) Appl. No.: 15/323,971

(22) PCT Filed: Jul. 1, 2015

(86) PCT No.: PCT/EP2015/064997
§ 371 (c)(1),
(2) Date: Apr. 26, 2017

(87) PCT Pub. No.: WO2016/005244
PCT Pub. Date: Jan. 14, 2016

(65) Prior Publication Data
US 2017/0227768 A1 Aug. 10, 2017

(30) Foreign Application Priority Data
Jul. 8, 2014 (FR) .................................... 14 01531

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *B60K 2350/2052* (2013.01); *G02B 2027/0156* (2013.01); *G02B 2027/0169* (2013.01)

(58) Field of Classification Search
CPC ........ G02B 27/0149; G02B 2027/0138; G02B 7/18; G02B 21/01; G02B 21/00; B60K 2350/405; G03B 21/00; G03B 21/28
USPC .......................... 353/13, 19, 98, 99; 359/841
See application file for complete search history.

(56) References Cited

U.S. PATENT DOCUMENTS

| 3,552,828 A | 1/1971 | Lawrence et al. |
| 3,802,764 A | 4/1974 | Ellis |
| 5,214,413 A | 5/1993 | Okabayashi et al. |

(Continued)

FOREIGN PATENT DOCUMENTS

| FR | 1575798 A | 7/1969 |
| JP | 58169111 A | 10/1983 |

*Primary Examiner* — Steven H Whitesell Gordon
*Assistant Examiner* — Jerry Brooks
(74) *Attorney, Agent, or Firm* — Leydig, Voit & Mayer, Ltd.

(57) ABSTRACT

A display device for a motor vehicle includes: a projection module for generating an image for a projection in a direction of gaze of a user of the display device along an optical path; a reflection and/or display element; a support element for the reflection and/or display element; and a holding element, comprising a protruding part relative to the reflection and/or display element. The reflection and/or display element is held between the support element and the holding element and in a fixed position relative to the support element.

7 Claims, 2 Drawing Sheets

(56) References Cited

U.S. PATENT DOCUMENTS

| | | | | |
|---|---|---|---|---|
| 6,837,581 B1 * | 1/2005 | Raines | ............... | G02B 27/0149 353/13 |
| 7,623,294 B2 * | 11/2009 | Harada | ................ | G02B 27/01 359/13 |
| 2013/0155520 A1 | 6/2013 | Shimada et al. | | |

* cited by examiner

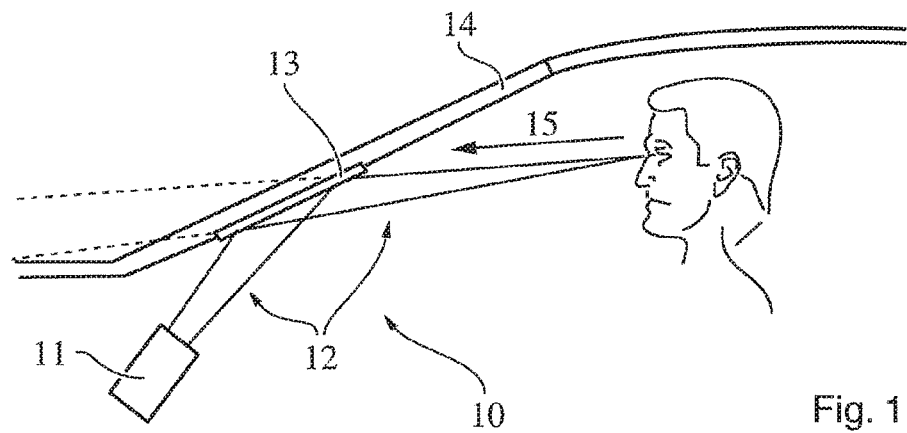
Fig. 1
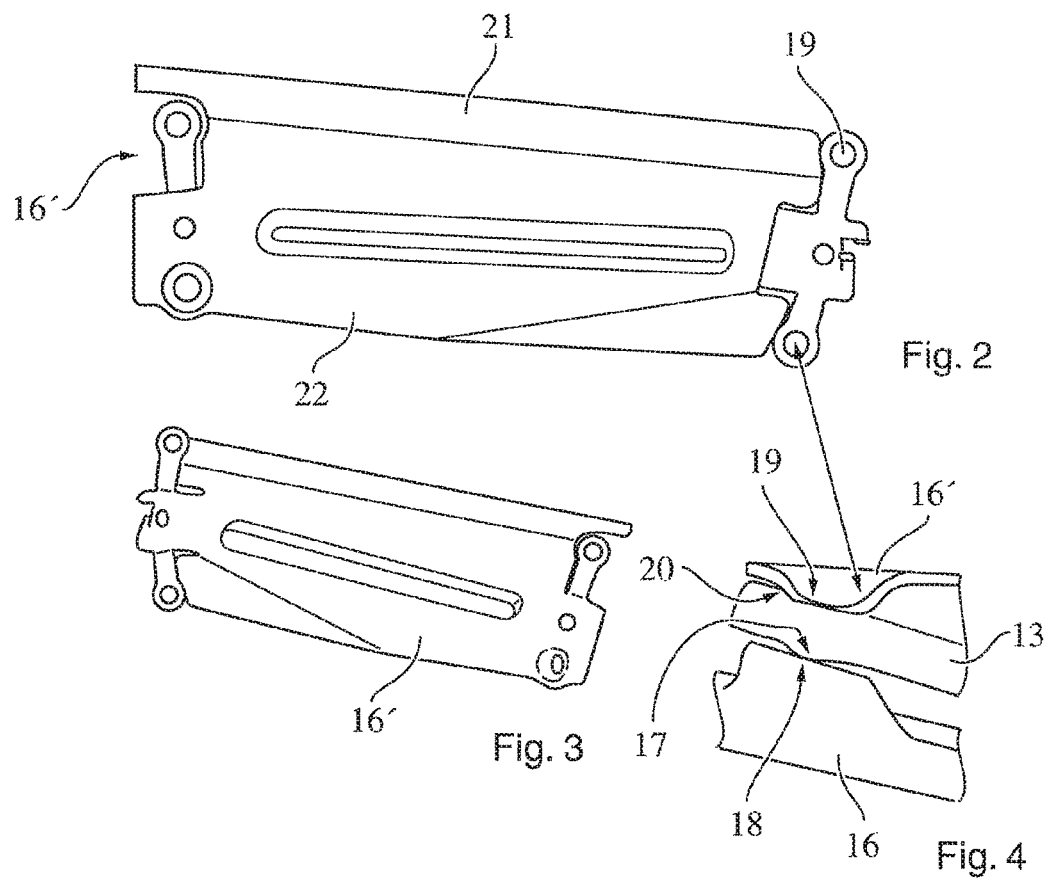
Fig. 2
Fig. 3
Fig. 4

DISPLAY DEVICE FOR A MOTOR VEHICLE

CROSS-REFERENCE TO RELATED APPLICATIONS

This application is a U.S. National Phase application under 35 U.S.C. § 371 of International Application No. PCT/EP2015/064997, filed on Jul. 1, 2015, and claims benefit to French Patent Application No. FR 14/01531, filed on Jul. 8, 2014. The International Application was published in French on Jan. 14, 2016 as WO 2016/005244 A1 under PCT Article 21(2).

FIELD

The present invention relates to a display device, particularly for a motor vehicle.

BACKGROUND

Display devices of head-up display (HUD) type are known, notably with the projection of an image to a windshield as described in the document U.S. Pat. No. 5,214,413 or to a reflection element.

The display devices with head-up display make it possible to project information into the field of view of the space in front of the motor vehicle in order for the driver of the motor vehicle to be able to read this information without averting the eyes from the space in front of the motor vehicle. At the same time, the information can be read without modifying the focusing of the eyes of the driver of the vehicle.

It is advantageous—according to the needs of a user of the vehicle—for the display devices to be able to take account of several positions of the head (or of the eyes) of the user of the vehicle.

One drawback with such devices according to the prior art consists in the fact that the efforts to produce specific functionalities, such as thermal protection and/or protection against stray reflections, and the link between the support element of a reflection and/or display element and the reflection and/or display element are relatively substantial.

SUMMARY

In an exemplary embodiment, the invention provides a display device for a motor vehicle. The display device includes: a projection module for generating an image for a projection in a direction of gaze of a user of the display device along an optical path; a reflection and/or display element; a support element for the reflection and/or display element; and a holding element, comprising a protruding part relative to the reflection and/or display element. The reflection and/or display element is held between the support element and the holding element and in a fixed position relative to the support element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a sectional schematic view of a display device according to the present invention.

FIGS. 2 to 4 are perspective schematic views of detailed views of a reflection and/or display element or of a link of the reflection and/or display element with a support element and/or a holding element.

DETAILED DESCRIPTION

Figure 5:
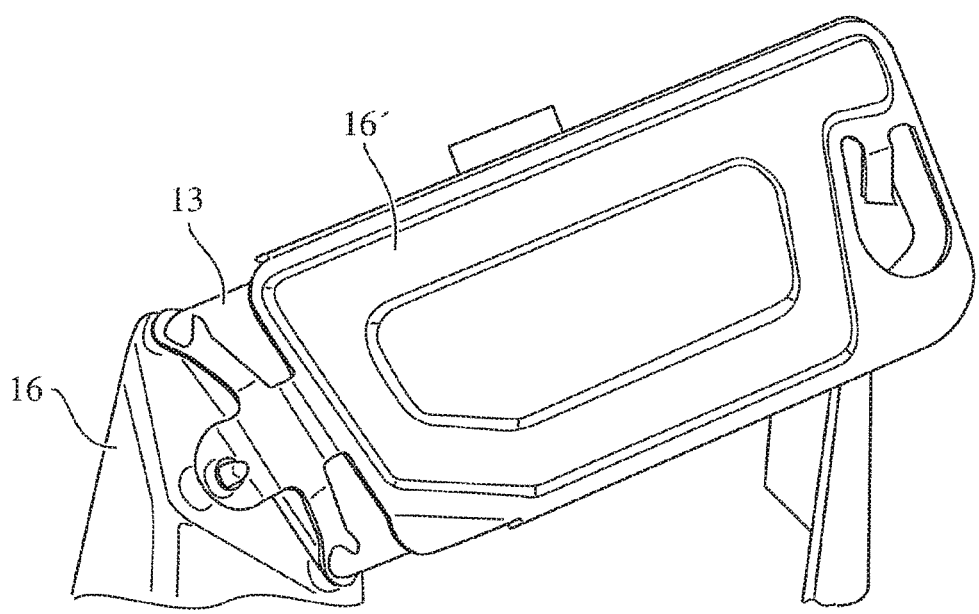
FIG. 5 is a perspective schematic view of a part of a display device according to the present invention with a reflection and/or display element.

Exemplary embodiments of the present invention mitigate the drawbacks of the prior art, and in particular those cited above, and also provide a display device with head-up display having a reflection and/or display element which is linked to its support reliably and inexpensively, while comprising additional functionalities as to thermal protection and/or protection against stray reflections.

In an exemplary embodiment, the present invention provides a display device, particularly for a motor vehicle, comprising a projection module for generating an image for a projection in the normal direction of gaze of a user of the display device along an optical path, the display device comprising a reflection and/or display element, and a support element for the reflection and/or display element, the display device also comprising a holding element such that the reflection and/or display element is held, solidly, between the support element and the holding element and in a fixed position relative to the support element, the holding element also comprising a protruding part relative to the reflection and/or display element.

Through such an embodiment of a display device, it is advantageously possible to produce a link between the reflection and/or display element and its support element simply and inexpensively. Moreover, it is advantageously possible, according to the present invention, for a thermal decoupling to be produced to protect, on the one hand, the components (electronic components in particular) which are placed behind the reflection and/or display element relative to the thermal flux due to the incident light on the reflection and/or display element and, on the other hand, to protect the reflection and/or display element, (in particular relative to deformations due to an excessive overheating) from the thermal flux deriving from the components behind the reflection and/or display element. Moreover, provision is made, according to the present invention, for the protruding part relative to the reflection and/or display element to reduce the stray reflections of the reflection and/or display element. The holding element according to the present invention is therefore advantageously capable of producing the functionalities of mechanical holding, of thermal protection as well as of protection against the stray reflections.

In a further exemplary embodiment, the reflection and/or display element and the support element are linked via first, second, third, fourth, fifth and sixth surfaces, the first, second and third surfaces being curved surfaces having a first radius, and the fourth, fifth and sixth surfaces being flat or curved surfaces having a second radius, the second radius corresponding to at least twice the first radius.

Through such an embodiment of the display device, it is advantageously possible to avoid material stresses in the material of the reflection and/or display element.

According to the present invention, each of the first, second and third surfaces corresponds to a surface of the fourth, fifth and sixth surfaces (in particular, the first surface corresponds to the fourth surface and vice versa, the second surface corresponds to the fifth surface and vice versa, and the third surface corresponds to the sixth surface and vice versa). It is thus possible to produce a link between the reflection and/or display element and its support element simply and inexpensively.

In a further exemplary embodiment, the reflection and/or display element and the holding element are linked via seventh, eighth, ninth, tenth, eleventh and twelfth surfaces, the seventh, eighth and ninth surfaces being curved surfaces having a third radius, and the tenth, eleventh and twelfth surfaces being flat or curved surfaces having a fourth radius, the fourth radius corresponding to at least twice the third radius.

Through such an embodiment of the display device, it is advantageously possible to avoid material stresses in the material of the reflection and/or display element.

According to the present invention, each of the seventh, eighth and ninth surfaces corresponds to a surface of the tenth, eleventh and twelfth surfaces (in particular the seventh surface corresponds to the tenth surface and vice versa, the eighth surface corresponds to the eleventh surface and vice versa, and the ninth service corresponds to the twelfth surface and vice versa). It is thus possible to produce a link between the reflection and/or display element and the holding element simply and inexpensively.

According to a variant of the present invention, it is also preferable for the holding element to be fixed to the support element such that surfaces of the support element and of the holding element bear on corresponding surfaces of the reflection and/or display element, respectively.

According to a preferred embodiment of the present invention, the protruding part relative to the reflection and/or display element comprises a curvature.

It is thus advantageously possible to avoid the stray reflections relative to the reflection and/or display element.

In a further exemplary embodiment, the reflection and/or display element comprises a main extension plane and two opposing sides and the reflection and/or display element comprises at least one pair of surfaces on each side at corresponding locations.

In a further exemplary embodiment, the first, second and third surfaces, and the tenth, eleventh and twelfth surfaces are surfaces of the reflection and/or display element, the fourth, fifth and sixth surfaces are surfaces of the support element, and the seventh, eighth and ninth surfaces are surfaces of the holding element.

In a further exemplary embodiment, the reflection and/or display element are configured to be moved between a position of rest and at least one display position such that the reflection and/or display element is moved between its position of rest and its at least one display position via the support element.

Other features and advantages of the invention will emerge from reading the following description of a nonlimiting particular embodiment of the present invention.

As FIG. 1 shows, a display device 10 according to the present invention comprises a projection module 11 which generates an image in the normal direction of gaze 15 of a user of the display device 10 along an optical path 12.

The optical path 12 normally comprises at least one reflection and/or display element 13. The optical path 12 can comprise a reflection element outside of the projection module 11 (as represented in FIG. 1). According to the present invention, a reflection and/or display element 13 is typically incorporated in the projection module 11. The optical path 12 can also comprise two reflection elements or two reflection and/or display elements, notably all incorporated in the projection module.

The normal direction of gaze 15 is the direction of view of a user of the display device 10, notably a vehicle driver, when the latter is watching, notably through a windshield 14, the outside which is located in front of the vehicle.

According to a preferred embodiment of the present invention, the reflection and/or display element 13 can be positioned in a position of rest and in at least one display position. When the reflection and/or display element 13 is positioned in its position of rest, the reflection and/or display element 13 is for example positioned inside a housing of the display device 10, notably inside the projection module 11. The position of rest and the display position of the reflection and/or display element 13 are changed through a rotational and/or translational movement.

The reflection and/or display element 13 has to be positioned relative to a housing, notably of the projection module 11 which is called support element 16. According to the present invention, a support element 16 or a support 16 is associated with the reflection and/or display element 13. The support 16 or the support element 16 can be likely to be driven between different positioning states, notably via the motor element.

In FIG. 5, a perspective schematic view of a part of the display device (notably the projection module 11) according to the present invention is shown with the reflection and/or display element 13 and the support element 16. Moreover, a holding element 16' is shown in FIG. 5. The reflection and/or display element 13 is positioned between the support element 16 and the holding element 16'.

FIGS. 2 to 4 show perspective schematic views and/or detailed views of the holding element 16' or of the link of the reflection and/or display element 13 with the support element 16 and/or the holding element 116'.

FIG. 2 schematically shows an example of the holding element 16' comprising a protruding part 21 relative to the reflection and/or display element 13 (in an assembled state of the display device 10). Preferably, the protruding part 21 of the holding element 16' comprises a curvature such that the holding element 16' surrounds, at least partially, the reflection and/or display element 13, at least on a side face of the reflection and/or display element 13. Moreover, the holding element 16' also comprises a thermal protective part 22 or part operating as thermal protection 22.

To ensure an adequate fixing between the reflection and/or display element 13 on the one hand and the support element 16 (and the holding element 16') on the other hand, the reflection and/or display element 13 is pressed against the support element 16, and the reflection and/or display element 16 is linked (or pressed) against the support element 16 at three different points using first, second, third, fourth, fifth and sixth surfaces. The first, second and third surfaces 17 are curved surfaces having a first radius, whereas the fourth, fifth and sixth surfaces 18 are flat or curved surfaces having a second radius, the second radius corresponding to at least twice the first radius. In the example represented in the figures, the first, second and third surfaces 17 are produced on the reflection and/or display element 13 and more specifically on the side thereof which is oriented toward the support element 16. In the example represented in the figures, the fourth, fifth and sixth surfaces 18 are produced on the support element 16 such that the fourth, fifth and sixth surfaces 18 are located opposite first, second and third surfaces 17 (see FIG. 4).

To ensure an adequate fixing of the reflection and/or display element 13 between the holding element 16' and the holding element 16', the holding element 16' bears against the reflection and/or display element 13 at three different points using seventh, eighth, ninth, tenth, eleventh and twelfth surfaces. The seventh, eighth and ninth surfaces 19 are curved surfaces having a third radius, whereas the tenth, eleventh and twelfth surfaces 20 are flat or curved surfaces having a fourth radius. The fourth radius corresponds to at least twice the third radius. In the example represented in the figures, the seventh, eighth, and ninth surfaces 19 are produced on the holding element 16' and more specifically on the side thereof which is oriented toward the reflection and/or display element 13. In the example represented in the figures, the tenth, eleventh and twelfth surfaces 20 are produced on the reflection and/or display element 13 such that the tenth, eleventh and twelfth surfaces 20 are located opposite the seventh, eighth and ninth surfaces 19 (see FIG. 4).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

10 display device
11 projection module
12 optical path
13 reflection and/or display element
14 windshield
15 normal direction of gaze
16 support element
16' holding element
17 location of the first, second and third surfaces
18 location of the fourth, fifth and sixth surfaces
19 location of the seventh, eighth and ninth surfaces
20 location of the tenth, eleventh and twelfth surfaces
21 protruding part relative to the reflection and/or display element
22 part operating as thermal protection

The invention claimed is:

1. A display device for a motor vehicle, comprising:
    a projection module for generating an image for a projection in a direction of gaze of a user of the display device along an optical path;
    a reflection and/or display element;
    a support element for the reflection and/or display element; and
    a holding element, comprising a protruding part relative to the reflection and/or display element;
    wherein the reflection and/or display element is held between the support element and the holding element and in a fixed position relative to the support element;
    wherein the reflection and/or display element and the support element are linked via first, second, third, fourth, fifth and sixth surfaces, the first, second and third surfaces being curved surfaces having a first radius, and the fourth, fifth and sixth surfaces being flat or curved surfaces having a second radius, the second radius corresponding to at least twice the first radius;
    wherein the reflection and/or display element is pressed against the support element at at least three different points using the first, second, third, fourth, fifth and sixth surfaces.

2. The display device as claimed in claim 1, wherein the reflection and/or display element and the holding element are linked by seventh, eighth, ninth, tenth, eleventh, and twelfth surfaces, the seventh, eighth and ninth surfaces being curved surfaces having a third radius, and the tenth, eleventh and twelfth surfaces being flat or curved surfaces having a fourth radius, the fourth radius corresponding to at least twice the third radius.

3. The display device as claimed in claim 1, wherein the holding element is fixed to the support element such that surfaces of the support element and of the holding element bear on corresponding surfaces of the reflection and/or display element.

4. The display device as claimed in claim 1, wherein the protruding part relative to the reflection and/or display element comprises a curvature.

5. The display device as claimed in claim 1, wherein the reflection and/or display element comprises a main extension plane and two opposing sides, and the reflection and/or display element comprises at least one pair of surfaces on each side at corresponding locations.

6. The display device as claimed in claim 1,
    wherein the reflection and/or display element and the holding element are linked by seventh, eighth, ninth, tenth, eleventh, and twelfth surfaces, the seventh, eighth and ninth surfaces being curved surfaces having a third radius, and the tenth, eleventh and twelfth surfaces being flat or curved surfaces having a fourth radius, the fourth radius corresponding to at least twice the third radius; and
    wherein the first, second and third surfaces, and the tenth, eleventh and twelfth surfaces are surfaces of the reflection and/or display element, the fourth, fifth and sixth surfaces are surfaces of the support element, and the seventh, eighth and ninth surfaces are surfaces of the holding element.

7. The display device as claimed in claim 1, wherein the reflection and/or display element is configured to be moved between a position of rest and at least one display position via the support element.

* * * * *